United States Patent
Ciampolini et al.

(10) Patent No.: US 10,135,103 B2
(45) Date of Patent: Nov. 20, 2018

(54) COOLING CIRCUIT WITH COOLING FLUID FOR LITHIUM BATTERIES, AND A VEHICLE COMPRISING SAID COOLING CIRCUIT

(71) Applicant: MAGNETI MARELLI S.P.A., Corbetta (Milan) (IT)

(72) Inventors: Franco Ciampolini, Corbetta (IT); Rosanna Suglia, Corbetta (IT); Danilo Pritelli, Corbetta (IT); Gianluca Aurilio, Corbetta (IT)

(73) Assignee: MAGNETI MARELLI S.P.A., Corbetta (IT)

(*) Notice: Subject to any disclaimer, the term of this patent is extended or adjusted under 35 U.S.C. 154(b) by 0 days.

(21) Appl. No.: 15/052,036

(22) Filed: Feb. 24, 2016

(65) Prior Publication Data

US 2016/0254577 A1    Sep. 1, 2016

(30) Foreign Application Priority Data

Feb. 26, 2015    (IT) .................. 102015902334362

(51) Int. Cl.
*H01M 10/63* (2014.01)
*H01M 10/6568* (2014.01)
(Continued)

(52) U.S. Cl.
CPC ..... *H01M 10/6568* (2015.04); *B60L 11/1874* (2013.01); *H01M 10/0525* (2013.01);
(Continued)

(58) Field of Classification Search
CPC ............. H01M 10/613; H01M 10/625; H01M 10/647; H01M 10/6551; H01M 2220/20;
(Continued)

(56) References Cited

U.S. PATENT DOCUMENTS 5,165,127 A * 11/1992 Nicholson ............ A47G 9/0215
165/46
6,379,837 B1 * 4/2002 Takahashi ............... H01M 2/08
429/120
(Continued)

FOREIGN PATENT DOCUMENTS

JP    6196208 A    7/1994
JP    2012114030 A    6/2012

OTHER PUBLICATIONS

Italian Search Report dated Oct. 30, 2015 for Italian Application No. 102015902334362 (PD2015A000048).

*Primary Examiner* — Kawing Chan
(74) *Attorney, Agent, or Firm* — Howard & Howard Attorneys PLLC (57) ABSTRACT

A cooling circuit with cooling liquid for lithium-ion batteries comprising a battery pack comprising a plurality of cells electrically connected with each other, suitable for powering an electric machine for traction. The cells are perimetrically delimited by external walls. At least one bag contains cooling liquid associated in contact with the outer walls of the cells. The bag is made of deformable plastic material so as to be counter-shaped to the outer walls to adhere perimetrally to the outer walls and the circuit provides forced circulation of the cooling liquid through said at least one bag.

17 Claims, 8 Drawing Sheets

(51) Int. Cl.
  *H01M 10/48*    (2006.01)
  *H01M 10/625*   (2014.01)
  *H01M 10/6551*  (2014.01)
  *H01M 10/6557*  (2014.01)
  *H01M 10/6565*  (2014.01)
  *H01M 10/613*   (2014.01)
  *B60L 11/18*    (2006.01)
  *H01M 10/0525*  (2010.01)
  *H01M 10/052*   (2010.01)

(52) U.S. Cl.
  CPC ....... *H01M 10/486* (2013.01); *H01M 10/613* (2015.04); *H01M 10/625* (2015.04); *H01M 10/63* (2015.04); *H01M 10/6551* (2015.04); *H01M 10/6557* (2015.04); *H01M 10/6565* (2015.04); *H01M 10/052* (2013.01); *H01M 2220/20* (2013.01); *Y02E 60/122* (2013.01)

(58) Field of Classification Search
  CPC ........... H01M 2/1077; H01M 10/0525; H01M 10/643; H01M 10/6563; H01M 10/6555; H01M 10/656; H01M 10/6567; H01M 10/6556; H01M 10/486
  USPC .......................................................... 318/139
  See application file for complete search history.

(56) References Cited

U.S. PATENT DOCUMENTS

| | | | | |
|---|---|---|---|---|
| 6,381,846 B2* | 5/2002 | Insley | ............... | F28F 3/048 29/890.03 |
| 6,410,185 B1* | 6/2002 | Takahashi | ........... | H01M 2/1077 429/163 |
| 7,270,910 B2* | 9/2007 | Yahnker | ............. | B25F 5/008 30/500 |
| 8,167,922 B2* | 5/2012 | Ko | ............. | A61F 7/00 5/421 |
| 8,353,374 B2* | 1/2013 | Sugawara | ............. | B60K 1/04 180/65.1 |
| 8,383,260 B2* | 2/2013 | Essinger | ............. | H01M 2/1016 429/120 |
| 8,475,952 B2* | 7/2013 | Yasui | ............. | H01M 2/1016 429/120 |
| 8,643,341 B2* | 2/2014 | Hamaguchi | ........... | B60L 3/0007 320/104 |
| 8,652,676 B2* | 2/2014 | Nishimura | .......... | H01M 10/647 429/120 |
| 8,662,413 B2* | 3/2014 | Rotondo | ............. | B05B 9/0861 239/152 |
| 2002/0177035 A1* | 11/2002 | Oweis | ............. | H01M 10/613 429/120 |
| 2005/0202310 A1* | 9/2005 | Yahnker | ............. | B25F 5/008 429/62 |
| 2007/0128505 A9* | 6/2007 | Yahnker | ............. | B25F 5/008 429/62 |
| 2008/0003491 A1* | 1/2008 | Yahnker | ............. | B25F 5/008 429/62 |
| 2008/0137290 A1* | 6/2008 | Tanaka | ............. | B60L 11/1874 361/690 |
| 2009/0163983 A1* | 6/2009 | Ko | ............. | A61F 7/00 607/104 |
| 2010/0055553 A1* | 3/2010 | Kimura | ............. | B60K 1/04 429/120 |
| 2010/0104938 A1* | 4/2010 | Hermann | ........... | H01M 2/1077 429/120 |
| 2010/0116570 A1* | 5/2010 | Sugawara | ............. | B60K 1/04 180/65.1 |
| 2011/0132580 A1* | 6/2011 | Herrmann | ............. | F28F 3/12 165/104.33 |
| 2011/0162820 A1* | 7/2011 | Weber | ............. | H01M 10/052 165/104.19 |
| 2011/0180625 A1* | 7/2011 | Rotondo | ............. | B05B 9/0861 239/152 |
| 2011/0200856 A1* | 8/2011 | Yasui | ............. | H01M 10/1016 429/88 |
| 2011/0206968 A1* | 8/2011 | Nishimura | .......... | H01M 10/647 429/120 |
| 2011/0212355 A1* | 9/2011 | Essinger | ............. | H01M 2/1016 429/120 |
| 2011/0291622 A1* | 12/2011 | Hamaguchi | ........... | B60L 3/0007 320/150 |
| 2012/0017371 A1* | 1/2012 | Pollard | ............. | A47G 9/0215 5/423 |
| 2012/0034507 A1* | 2/2012 | Harada | ............. | B60L 11/1874 429/120 |
| 2012/0183822 A1* | 7/2012 | Chung | ............. | H01M 2/1072 429/72 |
| 2013/0045411 A1* | 2/2013 | Bauer | ............. | F28F 3/025 429/120 |
| 2013/0192807 A1* | 8/2013 | DeKeuster | .......... | B60L 11/1874 165/170 |
| 2013/0309532 A1* | 11/2013 | Chung | ............. | H01M 2/1072 429/83 |
| 2014/0284124 A1* | 9/2014 | Sellergren | ........... | H01M 2/1083 180/68.5 |
| 2014/0342195 A1* | 11/2014 | Bhola | ............. | H01M 10/625 429/50 |
| 2015/0082821 A1* | 3/2015 | Ganz | ............. | F25B 1/005 62/259.1 |
| 2015/0093613 A1* | 4/2015 | Obasih | ............. | H01M 10/625 429/82 |
| 2015/0194712 A1* | 7/2015 | He | ............. | H01M 2/1252 429/50 |
| 2015/0233648 A1* | 8/2015 | Goseling | ............. | F28D 20/0043 165/10 |
| 2015/0299641 A1* | 10/2015 | Galliher | ............. | C12M 41/24 435/298.1 |
| 2015/0311572 A1* | 10/2015 | Sung | ............. | B60L 11/1864 429/62 |
| 2016/0172727 A1* | 6/2016 | Chan | ............. | H01M 10/6557 429/120 |
| 2016/0233564 A1* | 8/2016 | Rinker | ............. | H01M 10/6556 |

* cited by examiner

COOLING CIRCUIT WITH COOLING FLUID FOR LITHIUM BATTERIES, AND A VEHICLE COMPRISING SAID COOLING CIRCUIT

CROSS-REFERENCE TO RELATED APPLICATIONS

The present application claims priority to and all the benefits of Italian Patent Application No. 102015902334362, filed on Feb. 26, 2015, the entire content of which is expressly incorporated herein by reference.

BACKGROUND OF THE INVENTION

1. Field of the Invention

This invention relates to a cooling circuit with cooling fluid for lithium batteries, and a vehicle comprising the cooling circuit.

2. Description of the Related Art

As is known, in modern hybrid vehicles, i.e., comprising an endothermic propulsion unit (ICE) and an electric propulsion unit, the battery pack that powers the electric propulsion unit is of particular importance.

In fact, this battery pack is often a major cost item among the components of the hybrid/electric system and is also the component that is most delicate and subject to deterioration over time.

Among the major cost items of a battery pack, there is in fact the cost of the related cooling system. The high currents and particularly intense operating cycles characteristic of the battery packs used for the traction of electric vehicles produce a high heat, that must be dissipated effectively and quickly from the inside of the battery pack to prevent it causing deterioration phenomena in the active components of the battery.

Furthermore, an effective cooling system for traction power supply batteries must meet several requirements, in particular it must be efficient and lightweight. It is necessary to avoid excessively weighing down the vehicle equipped with the hybrid power supply to avoid that the extra weight could nullify, at least partly, the advantages in terms of fuel consumption and pollution linked to the use of hybrid propulsion.

Furthermore, an excessive weighing down would limit the autonomy of the electric propulsive unit and excessively penalise the performance and dynamic qualities of the vehicle itself.

In addition, the cells of lithium-ion batteries are particularly delicate and, in order to last as long as possible, they must work in specific temperature ranges and preferably should not exceed an average operating temperature of 45° C. If this range is exceeded, the degradation of the batteries is rather marked and irreversible.

This technical problem is not easy to solve since, for reasons of overall dimensions, the automotive industry uses batteries with high power densities, i.e., very compact compared to the power supplied. Therefore, these batteries are small volumes with respect to the power output and, therefore, are rather difficult to cool efficiently and uniformly.

In addition, there is the problem of the location of the batteries on the vehicle, and in particular on motor vehicles. In fact the positioning of the batteries in the engine compartment, albeit in a position distant from the engine, increases the heat dissipation problems since the heat produced by the batteries is added to that product by the engine (whether endothermic, electric or both). It is also true that the positioning of the batteries in the engine compartment avoids the use and positioning of the relative power cables and cooling systems, which must traverse the entire vehicle to reach the passenger compartment or the rear trunk.

The solution that provides for the positioning of the batteries in the passenger compartment or rear trunk involves additional disadvantages. For example, the already-mentioned wiring and cooling systems must traverse a large part, or the entire length, of the vehicle. In addition, it steals space from the passenger and/or luggage in return for distancing the batteries from the heat sources constituted by the propulsor.

There are various solutions in the known art that attempt to solve the problem of an efficient cooling of the battery pack.

For example, there are air cooling solutions that provide for the use of fans that blow air on the batteries. Such systems are not always efficient especially if used on high power density batteries that therefore offer small heat exchange surfaces in relation to their volume and the thermal power generated. One can attempt to improve the cooling efficiency, for example with large air flows, by using for example the air conditioning system with which the vehicle is equipped; this increases consumption and also increases cooling system noise. This latter situation can become annoying in the case where the batteries and system are located inside the passenger compartment.

There is then a further problem related to forced-air cooling systems. These systems are entirely non-operational and non-functional when the vehicle's engine is turned off. Therefore, if the vehicle is left in the sun for hours, it is not uncommon for the passenger compartment to reach temperatures higher than 45° C., which, in any case, damages the batteries even if they are not operating. This damage is irreversible and results in a drastic reduction of the useful life of the batteries.

Liquid cooling solutions are also known in which cooling liquid, suitably thermostatted, for example by a radiator, is made to circulate in such a way as to directly lap the outer surface of the batteries. Solutions are also known of cooling liquid channelisations arranged in contact with, or in proximity of, the outer walls of the battery cells with the purpose of removing the heat. At present, such solutions do not always ensure an adequate heat exchange coefficient between the channelisations and the walls of the batteries and are, in any case, solutions that add weight and also significant volume to the battery, and have non-negligible costs.

Finally, in order to reduce the overheating of the batteries, it is known in the art to over-dimension the battery pack so as to ensure that the individual cells work in conditions sufficiently distant from the maximum power and therefore produce less heat. However, this solution does not solve the problem of overheating and also introduces other disadvantages related to the increased cost and weight of the battery pack linked to such over-dimensioning.

SUMMARY OF THE INVENTION

The Applicant has found that the solutions of the art are not able to resolve the above-listed technical problems. Therefore, there is a need to solve the drawbacks and limitations mentioned in reference to the prior art. More specifically, there is a need to provide a cooling system for lithium batteries that is efficient and at the same time reliable and economical.

The present invention overcomes the deficiencies in the related art in a cooling circuit with cooling fluid for lithium ion batteries that includes a battery pack having a plurality of cells electrically connected to each other, suitable for powering an electric machine for traction. The cells are perimetrally delimited by outer walls. At least one bag containing cooling fluid associated with contact with the outer walls of the cells, wherein the bag is made of electrically insulating and deformable material so as to be counter-shaped to the outer walls to adhere perimetrally to the outer walls. A circulation member acts to force the cooling fluid through the bag, wherein spaces are arranged between the cells adjacent to each other that create abutments for the packing of the cells composing the battery pack. The bag interposed between adjacent cells has a thickness/shape less than that of an interspace between the adjacent cells, so that is not compressed between adjacent cells.

Other objects, features and advantages of the present invention will be readily appreciated as the same becomes better understood after reading the subsequent description taken in connection with the accompanying drawings.

BRIEF DESCRIPTION OF THE DRAWINGS

The members, or parts of members, in common between the embodiments described below will be indicated with the same reference numbers.

DETAILED DESCRIPTION OF THE INVENTION

With reference to the above figures, reference number 4 globally indicates an overall schematic view of a liquid cooling circuit, containing for example water, for batteries, for example lithium-ion batteries, according to this invention.

This cooling circuit with cooling liquid 4 is particularly applicable to electric propulsion vehicles (FEV) or even hybrid propulsion vehicles, i.e., electric and endothermic. In any case, the cooling system is applied to cool a battery pack 8 that powers an electric machine for traction 12 of said vehicle.

For the purposes of this invention, the type, size and power of the electric machine for traction 12 and the type of vehicle are irrelevant, meaning by the term vehicle all the means of traction with two, three, four or more wheels.

As regards the type of batteries, this invention is preferably designed for the cooling of lithium-ion batteries that, as described above, require particular attention to temperature control, but the scope of protection of this invention should not be understood to be limited to this one specific type of batteries.

As mentioned, the cooling circuit with cooling fluid for lithium-ion battery 4 comprises a battery pack 8 that, in turn, comprises a plurality of cells 16 electrically connected to each other, suitable to power an electric machine for traction 12.

The cells 16 can be electrically connected to each other by electrical bridges 18, in a known manner.

The cells 16 are perimetrally delimited by outer walls 20. In the accompanying figures the cells have a parallelepiped shape and, therefore, the outer walls 20 are flat walls and perpendicular to each other. For the purposes of this invention, any geometry, shape and size of the cells can be provided for, even not parallelepiped and not square; the accompanying figures are only intended as non-limiting examples of possible embodiments of this invention.

Advantageously, the cooling circuit 4 comprises at least one bag 24 containing cooling fluid associated in contact with said outer walls 20 of the cells 16.

The bag 24 comprises cooling fluid adduction channels 26 that allow supplying fluid in the bag 24 and its evacuation from the bag itself.

The flow of coolant fluid is put into circulation in a forced manner with the aid of forced circulation of the coolant liquid through the at least one bag.

The at least one bag 24 is made of electrically insulating and deformable material so as to be counter-shaped to said outer walls 20 to adhere perimetrally to them.

The kind of electrically insulating material may be various; preferably, but not exclusively, a plastic material, but also a rubber, a polymer, a wooden material, a fiber material may be used.

With the word 'deformable' it is intended not only that the material 'itself' is deformable but also that the bag 24 may be deformable as a whole when subjected to the working pressures of the coolant fluid flowing within it.

In other words, it is possible to use a material that, for example in view of its thickness, is deformable under the working pressure of the coolant fluid.

Moreover, with the word 'deformable' it is intended that the bag 24 may adapt its shape to the shape of the outer walls 20, so as to adhere perimetrally to them as much as possible, in order to increase the extent of the heat exchange surface.

Of course, when choosing the material and the dimensions of the bag 24, it is necessary to mediate between the electrical insulating property and the thermal conductive property which, wherein the latter has to be improved.

In other words, the bag 24 encloses an inner volume that receives and circulates cooling liquid; contact with the outer walls 20 of the cells 16 allows the removal of the heat generated by the cells themselves.

The removal of heat occurs both by conduction, with the contact between the outer walls 20 and the bag 24, and by convection due to the circulation of the cooling liquid inside the bag 24. There is also a contribution of radiation due to the heat that is propagated from the cells to the bag.

Preferably, the bag 24 is at least partially attached to the outer walls 20 by interposed thermally conductive adhesives. By at least partially means that it is possible to provide individual bonding points or whole bonding areas and zones as to favour and therefore more or less increase the contact surface between the bag 24 and the outer walls 20 of the cells 16.

The thickness of the material constituting said bag 24 is preferably comprised between 50 and 350 µm. The choice of thickness depends, on the one hand, on the choice of the material with which it is made and, at the same time, it must fulfil the need to promote heat exchange and the deformability of the bag 24 as a function of the geometry of the cells 16 and, on the other, the need to ensure the hermetic seal of the cooling liquid in all operating conditions and over time, also considering the over-pressure of the cooling system, as better described below.

Figure 6:
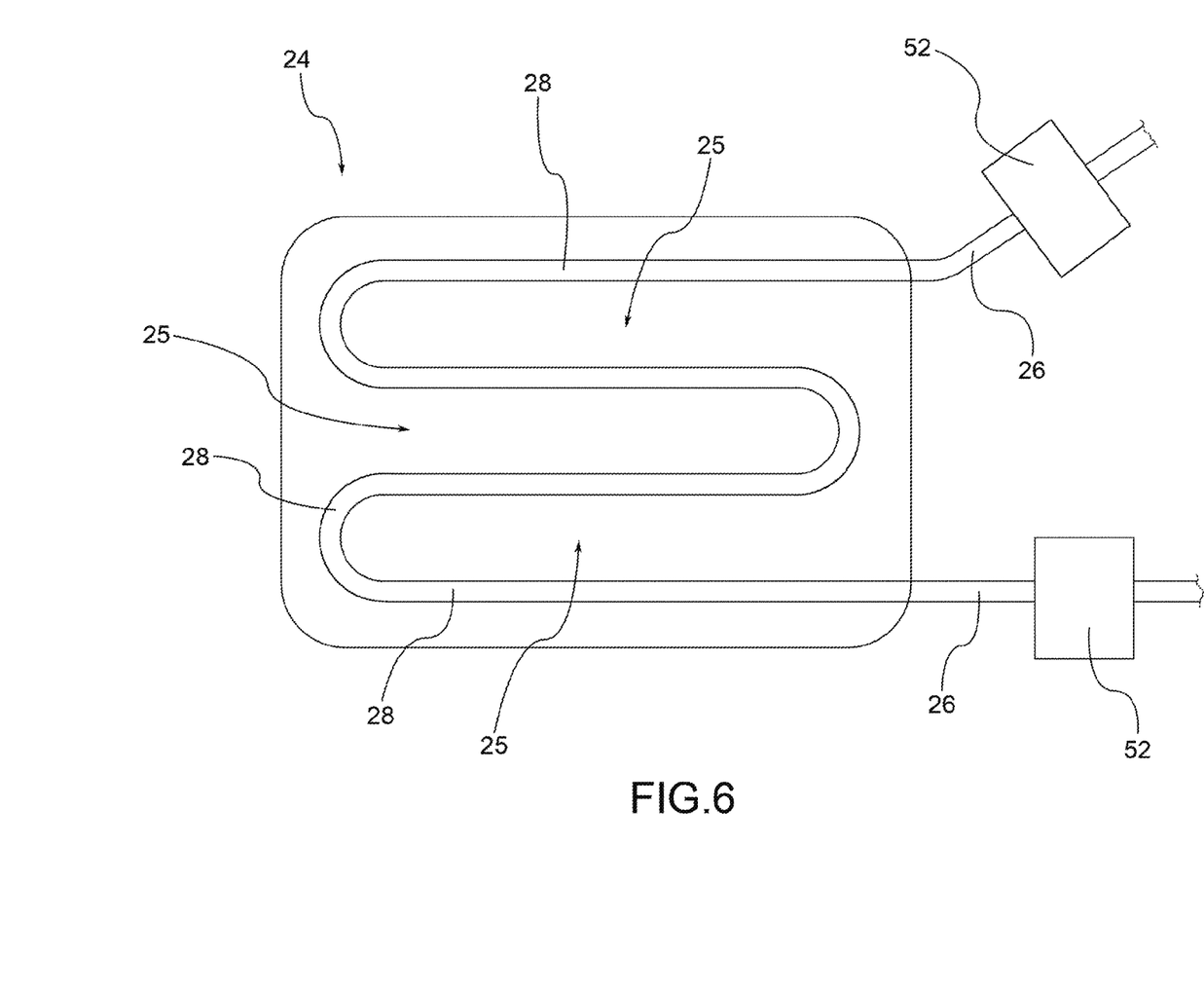
FIG. 6 is a side view of details of the cooling circuit of this invention, according to the embodiment illustrated in FIG. 5.
Figure 9:
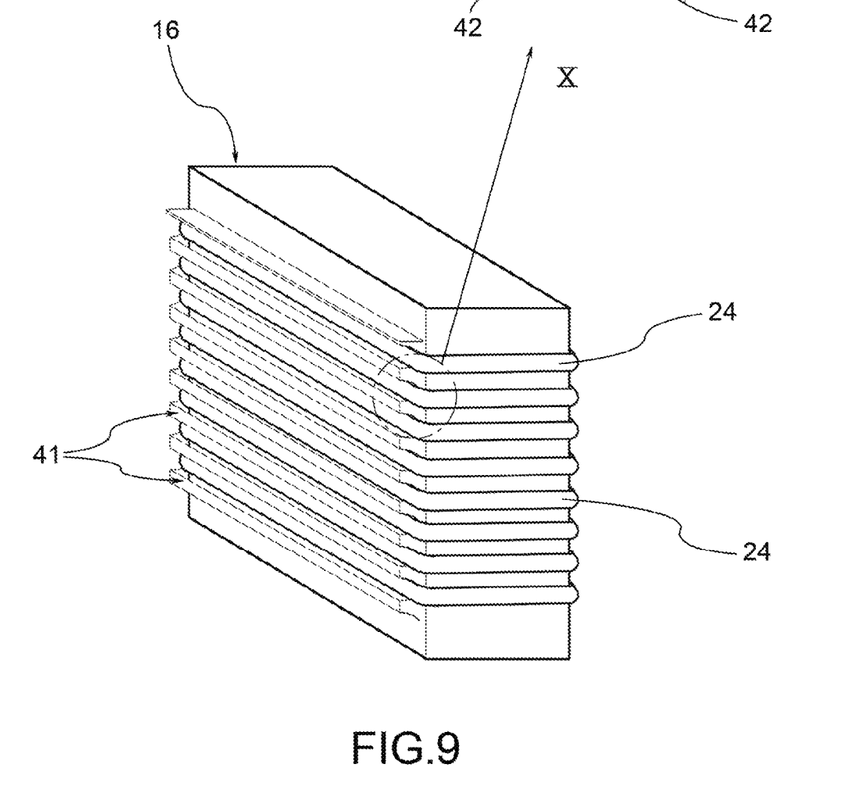
FIG. 9 is a perspective view of a cell according to a further possible embodiment of this invention.
Figure 10:
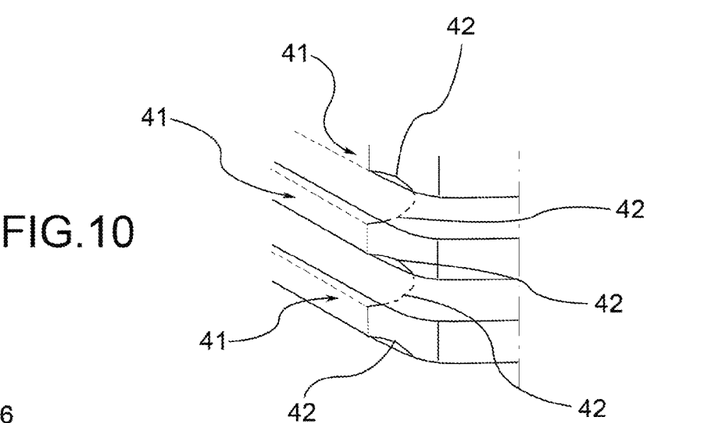
FIG. 10 shows the enlarged detail X of FIG. 9.
Figure 11:
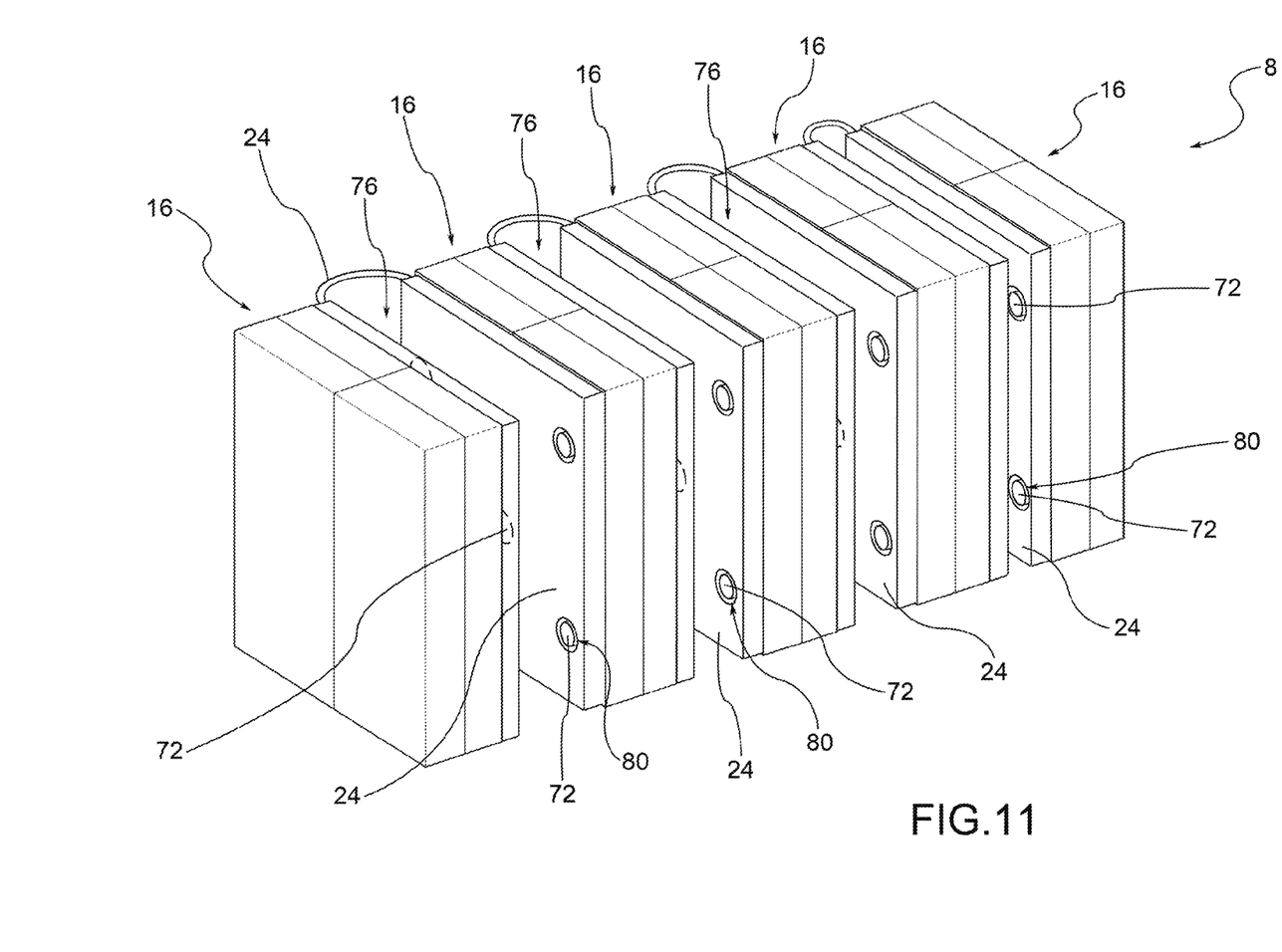
FIG. 11 is a schematic view of further embodiment variants of battery cells according to this invention.

According to an embodiment, the bag 24 comprises at least one internal path 26 so as to create a circulation of the cooling fluid according to a predetermined path. In other words, the bag 24 (FIG. 6) does not delimit a single volume or chamber containing the cooling liquid but, in its interior, contains a plurality of partition walls that define and delimit a precise path for the coolant liquid, for example serpentine. According to a possible alternative, bag 24 may comprise a plurality of partition walls 25 that define and delimit a precise path for the coolant liquid, for example comparable to the bottom of a boat. In other words, the partition walls 25 may delimit specific paths for the fluid, define elongated or enlarged portions and portions having tubular or substantially flat shape and so on.

According to a possible embodiment (FIG. 7), said bag 24 has a tubular conformation so as to be folded and wrapped around the outer walls 20 of said cells 16. The tubular conformation, for example, illustrated in FIGS. 7, 8 and 12 allows a facilitated deformability of the bag 24, which may be wrapped and/or shaped at will around the outer walls 20 to be cooled.

Figures 5, 5A, 7, 8:
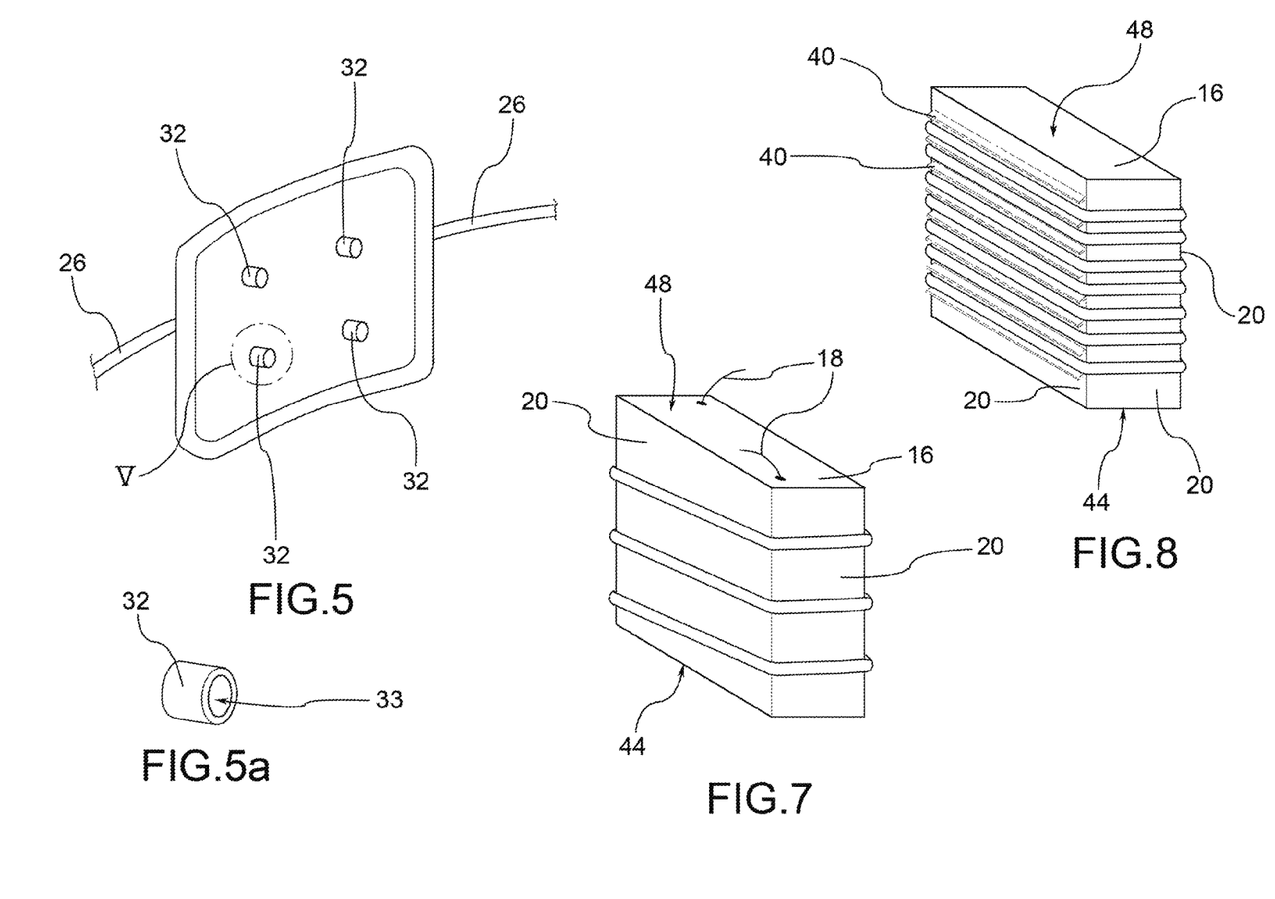
FIG. 5 is a perspective view of details of the cooling circuit of this invention, according to possible further embodiment variants.
FIG. 5A shows the enlarged detail V of FIG. 5.
FIG. 7 is a perspective view of embodiment variants of battery cells according to this invention.
FIG. 8 is another perspective view of embodiment variants of battery cells according to this invention.
Figure 12:
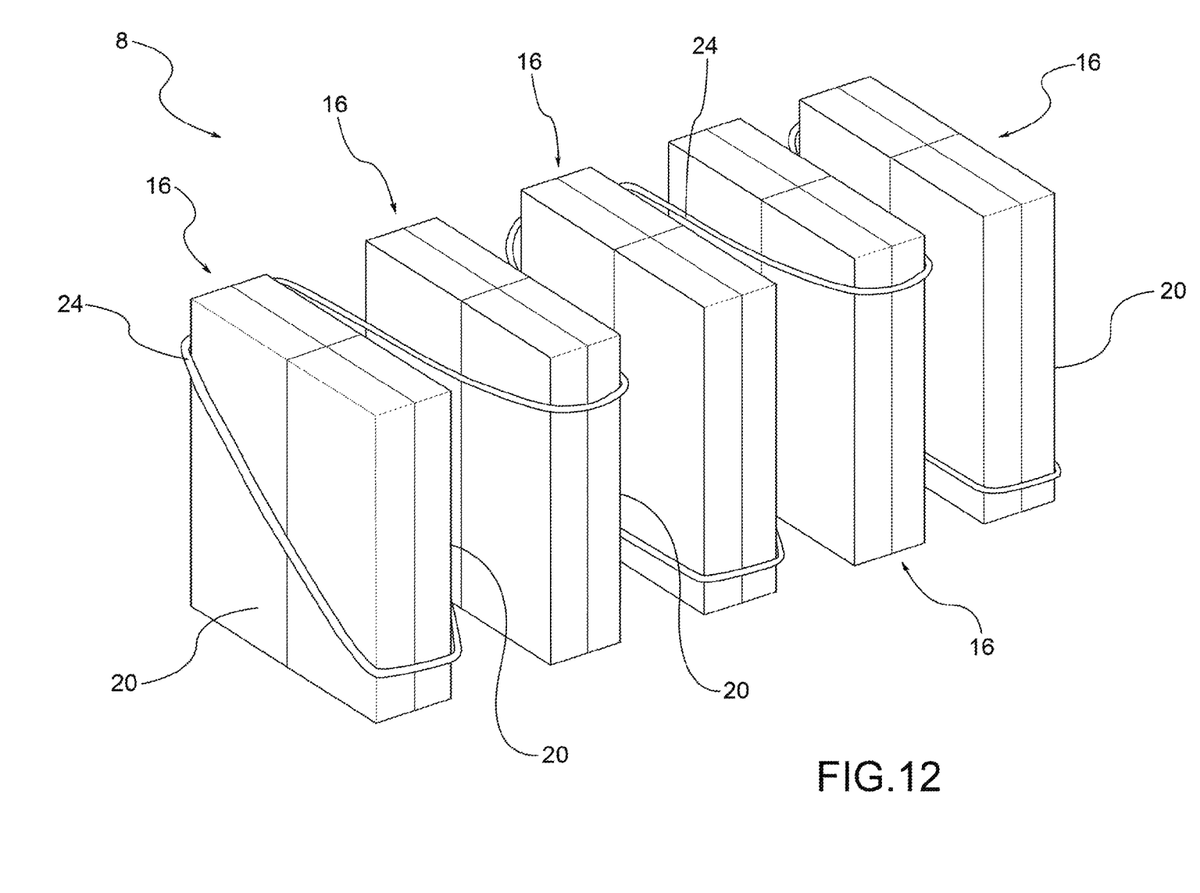
FIG. 12 is a schematic view of further embodiment variants of battery cells according to this invention.

Obviously the bag, whether tubular or not, can be wrapped around the walls of the cells 16 according to any path and any number of wrappings; what is illustrated in the cited figures are purely non-limiting examples of several possible arrangements of the pouch 24 around the cells themselves.

According to an embodiment, to the bag 24 is associated a plurality of connecting elements 32 suitable for performing an anchorage between the bag 24 and the outer walls 20 of the cells 16.

Preferably, said connecting elements 32 are thermally conductive so as to facilitate heat dissipation from the cells 16 to the cooling fluid contained in the bag 24.

The connecting elements 32 can be shaped for example as bushings, so as to realise point-like anchorages between the bag 24 and the outer walls 20. For example, the connecting elements 32 are attached to the outer walls 20 of the cells 16 via thermally conductive adhesives.

According to a possible embodiment, the connecting elements 32 are positioned in the vicinity of curved portions 36 of the bag 24 around the outer walls 20 of the cells 16. Doing this ensures the correct positioning of the bag in the most critical zones, i.e., the zones of greater curvature and therefore subject to greater mechanical stress.

According to an embodiment (FIG. 5a), the connecting elements are hollow bushings, i.e., provided with a cavity 33, which are traversed by the cooling liquid and which are arranged in direct contact with the outer walls of the cells: in this way, in correspondence of the bushings, there is a direct contact, i.e., not prevented by the bag 24, between the cooling liquid and the outer walls 20 of the cells 16. This direct contact promotes heat exchange and thus cooling of the cells 16. Obviously in correspondence of such hollow bushings it is necessary to ensure the hermetic seal of the cooling liquid, for example through the use of sealants such as silicones, or via the aforementioned thermally conductive adhesives.

According to an embodiment, the outer walls 20 of at least one cell 16 are provided with cooling fins 40.

The cooling fins 40 are typically cantilevered with respect to the outer walls 20 and have a geometry that tapers away from the outer walls 20 to which they are mechanically and thermally connected. These cooling fins 40, in known manner, allow a heat dissipation by radiation that can cooperate with the removal of the heat obtained by the cooling liquid to improve the contact surface with the bag or parts of it and to better contain the bag.

According to a possible embodiment, the fins are shaped so as to have side edges 41 substantially flat. These side edges 41 can thus act as spacers for the cells 16 adjacent and alongside each other.

According to a possible embodiment, the fins comprise inclined walls 42 at least partly counter-shaped with portions of the bag 24 itself. For example, the inclined walls 42 are concave in order to accommodate tubular, cylindrical segments of the bag 24. In other words, the bag comprises tubular segments that are inserted between the concave and semi-cylindrical inclined walls 42, so as to constitute a greater support and heat exchange surface between the bag 24 and the walls of the cells 16. This increased contact surface improves the heat exchange and thus the cooling efficiency of the cells 16.

According to a possible embodiment (FIG. 8), at least one bag 24 is applied in contact with at least one cooling fin 40. For example, a bag 24 can be arranged in the air space between two cooling fins 40 adjacent to each other so as to cooperate with the cooling fins 40 in the removal of heat cells 16.

As described above, the cooling system 4 comprises at least one bag 24 filled with cooling fluid.

According to an embodiment, the cooling circuit 4 comprises a plurality of bags 24, each associated with a cell 16, said bags 24 being fluidically connected to each other. In other words the same cooling liquid flows through all the bags 24 provided in the circuit.

It is also possible to provide two separate feeds of cooling liquid in at least two distinct bags 24 fluidically separated from each other.

According to a further embodiment, a same bag 24 may be associated to a plurality of cells 16.

Figure 1:
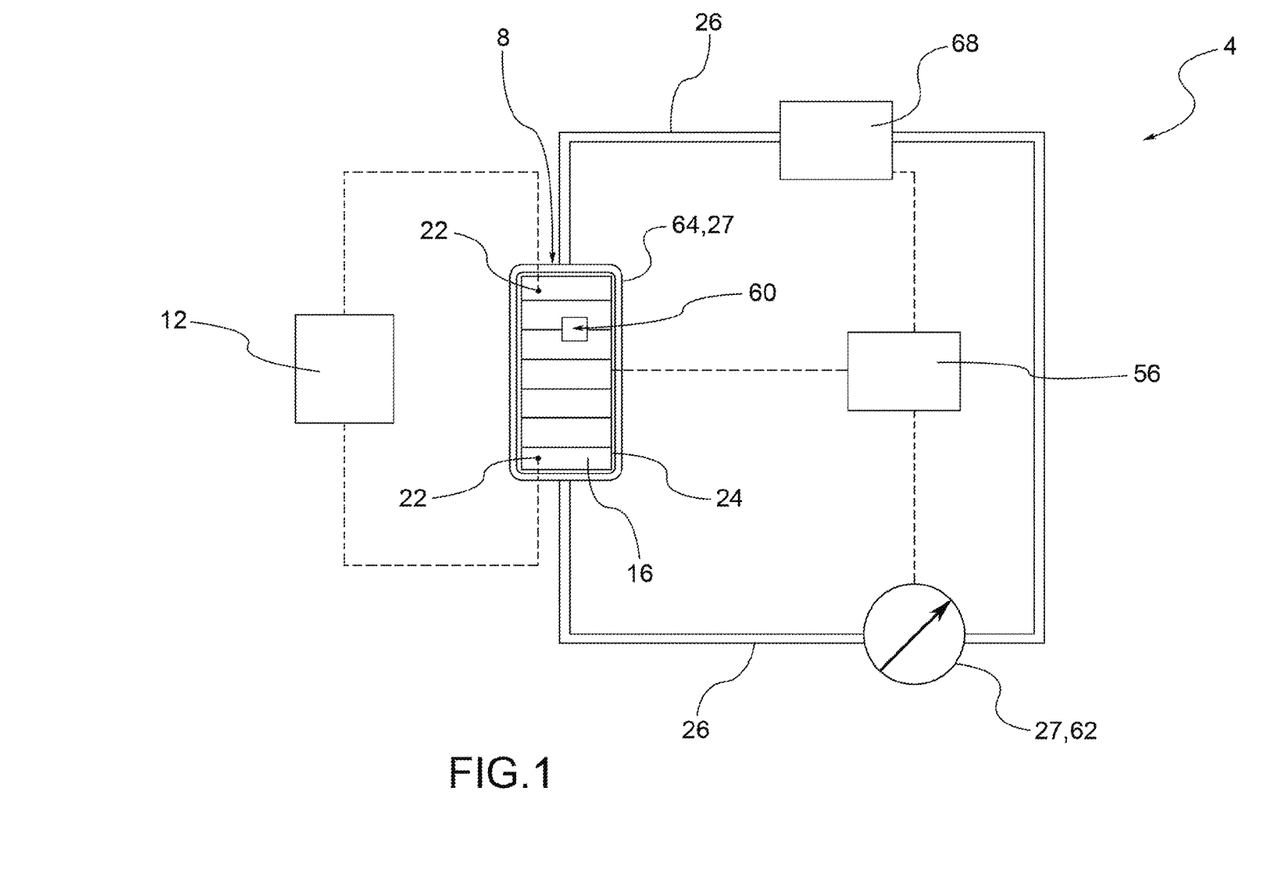
FIG. 1 is a schematic view of a cooling circuit with cooling fluid for lithium batteries according to this invention.
Figure 2:
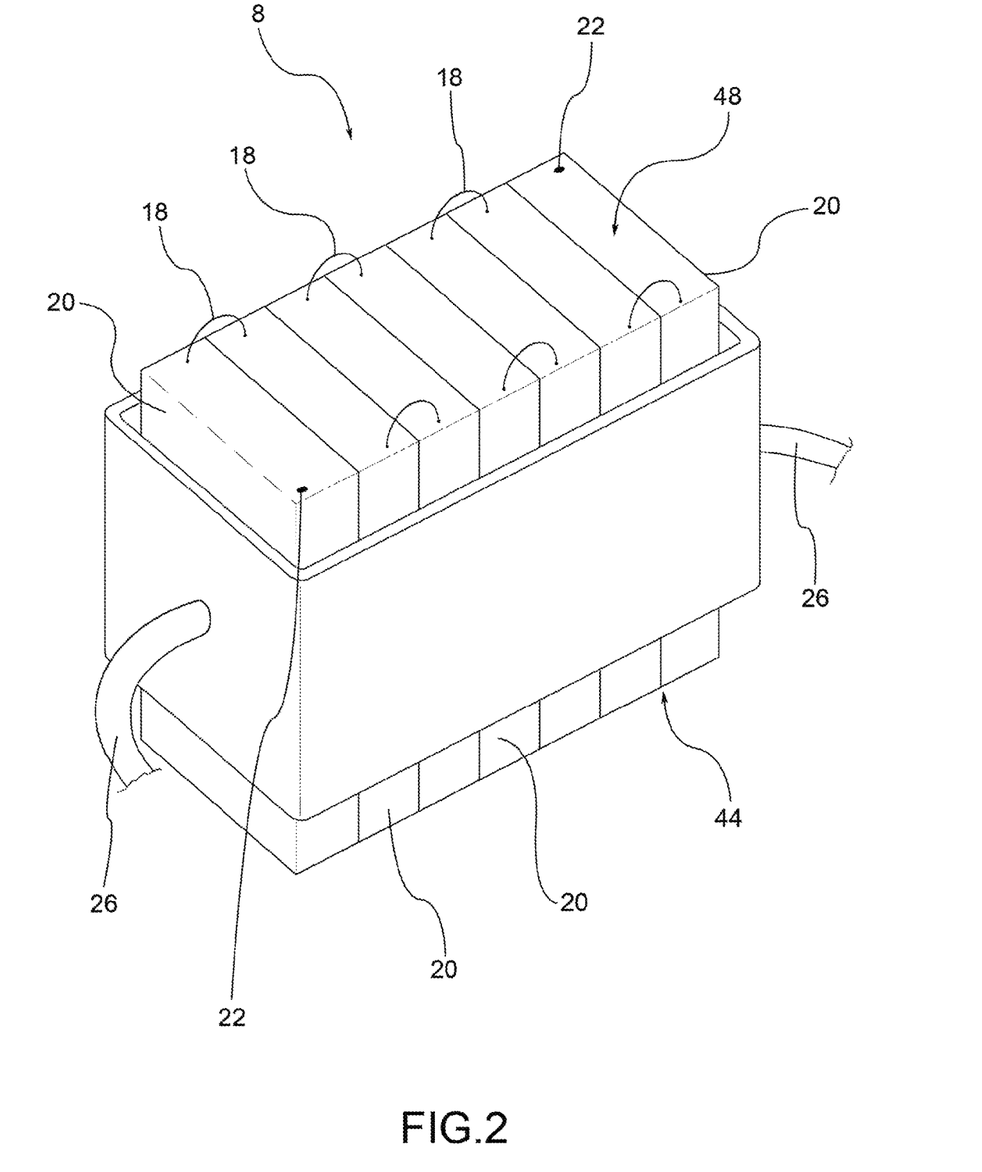
FIG. 2 is a partial perspective view of a cooling circuit according to this invention.
Figure 3:
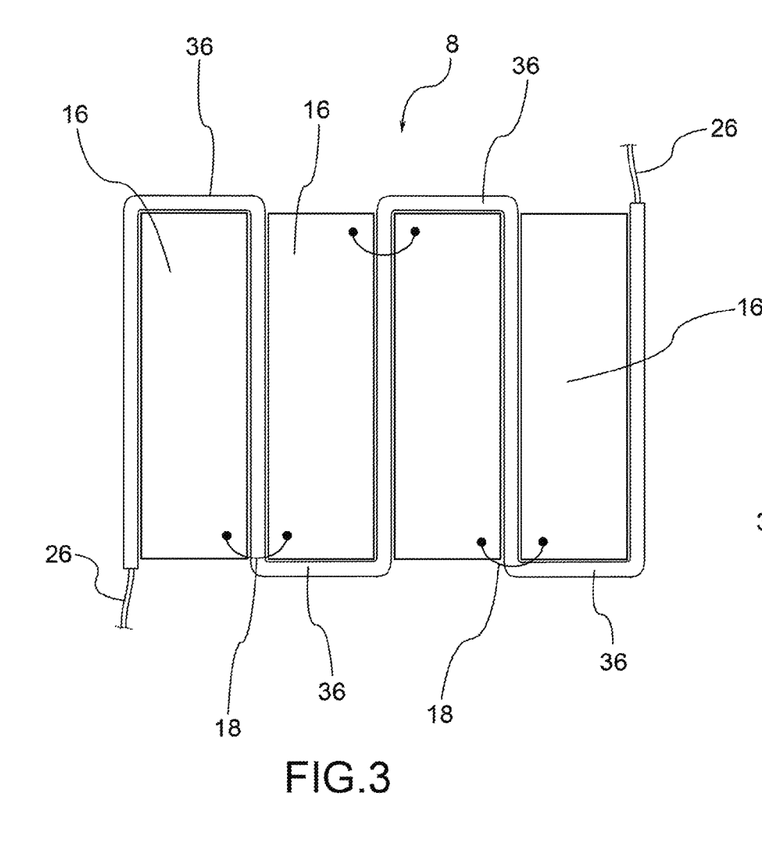
FIG. 3 is a plan view of details of the cooling circuit of this invention, according to one possible embodiment.
Figure 4:
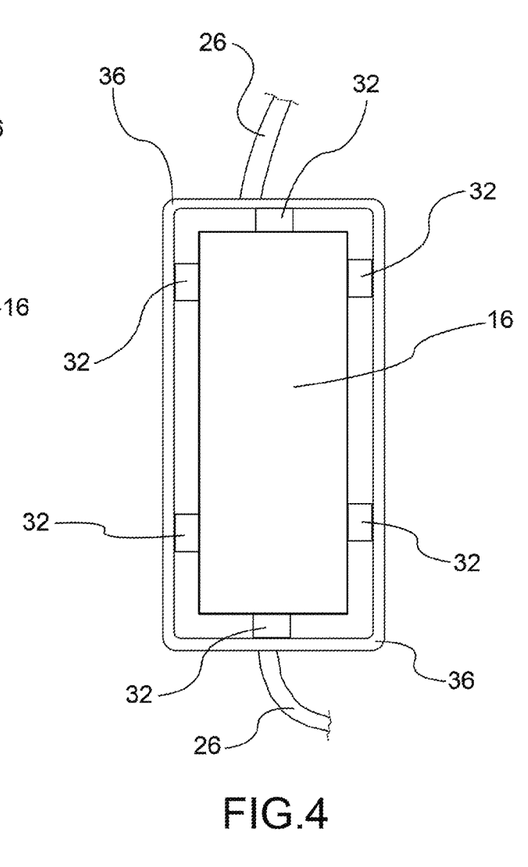
FIG. 4 is a plan views of details of the cooling circuit of this invention, according to another possible embodiment.

For example, FIG. 3 illustrates a single bag 24 that is wrapped around and associated to a plurality of cells 16 adjacent and consecutive to each other.

It is also possible to provide that the outer walls 20 subjected to removal of heat comprise the bottom walls 44. The bottom walls 44 define a support plane of the cells 16 and top walls 48 are opposite to the bottom walls 44 and typically comprise the connection terminals 22, i.e., the positive and negative poles of the battery pack as well as the electrical bridges 18 that link the various cells 16 together with each other.

For example, it can be provided that the cells 16 rest with their bottom walls 44 on at least one bag 24 disposed on a support plate of a housing compartment of the battery pack, provided in the vehicle.

It is also possible to provide that the bag 24 be at least partially superimposed on the battery pack 8 so as to cover, at least partially, the top walls 48.

According to a possible embodiment, at least one bag 24 comprises at least one delivery valve 52 suitable to permit/inhibit the circulation of liquid inside said bag 24 or a portion of said bag 24.

The delivery valves 52 are able to vary the flow entering and exiting the bag 24 so as to adjust the cooling provided by that bag 24. The delivery valve 52 can be brought from a fully open position, which allows the maximum possible flow, to a fully closed condition that blocks the flow of cooling liquid.

The cooling circuit 4 comprises a processing control unit 56 of the operation of the circuit itself and at least one temperature sensor 60 disposed in the vicinity of at least one of said cells 16.

The processing and control unit 56 is operatively connected with the temperature sensor 60 and with forced circulation 27 so as to control the actuation of the forced circulation 27 as a function of the temperature measured of the cells 16.

In this way, the processing and control unit 56 is able to give feedback thanks to the temperature signal received from at least one temperature sensor 60, so as to ensure that the temperature of the cells 16 remains within a predetermined range.

Such control of the temperature of the cells 16 is accomplished, as seen, by acting on the adjustment of the forced circulation 27. In addition, according to an embodiment, the processing and control unit 56 is programmed to open/close said at least one delivery valve 52 depending on the temperature of the cell 16 influenced by the bag 24 which comprises said delivery valve 52 itself.

In this way, the processing and control unit not only acts by adjusting the forced circulation 27 but also by adjusting the individual delivery valves 52, in a more capillary manner on the individual cells 16.

According to an embodiment, the forced circulation 27 of cooling liquid includes a recirculation pump 62. This recirculation pump 62 can have a variable speed and/or flow rate so as to allow all the adjustments of the case; preferably, said recirculation pump 62 is operatively connected to the processing and control unit 56.

According to an embodiment, the forced circulation 27 of cooling liquid may also include a flexible lung 64 which pressurises the liquid inside said cooling circuit 4, so as to favour contact between the cooling liquid and the outer walls 20 of the cells 16.

Said flexible lung 64 substantially creates a slight overpressure that facilitates the greatest possible contact, and therefore greatest thermal exchange, between the bag 24 and the outer walls 20 of the cells 16.

The flexible lung 64 may for example be inserted around the bag 24 which in turn surrounds the battery pack 8 or the individual cells 16.

According to a possible embodiment, the flexible lung 64 is a sort of elastic tube that wraps the bag 24, compressing it against the outer walls 20 of the cells 16 to be cooled. The flexible lung has a sort of containment effect that crushes the bag against the outer walls 20.

According to a further embodiment, the flexible lung 64 comprises a containment structure arranged around the bag so as to influence the bag in abutment against the outer walls of the cells 16 to be cooled. For example, such a containment structure encloses an elastic membrane that, from one side, interfaces with the bag 24 and, from the other, is elastically influenced in compression against the bag by an elastic member such as springs and/or pressurised fluids.

The cooling circuit 4 also comprises a heat exchanger 68 that has the function of thermostatting the cooling liquid contained in the circuit; this heat exchanger is arranged in series in the circuit and is traversed by the cooling liquid sent to the bags 24.

Advantageously, between adjacent cells 16 are spacers 72 that have the function of creating abutments for the packing of the cells 16 that constitute the battery pack 8. The bag 24 interposed between adjacent cells 16 does not interface with said spacers 72, i.e., is not compressed between adjacent cells 16. According to a possible embodiment, the bag is interposed in an air space 76 identified between two adjacent cells and packed between them. For example, the thickness of the bag 24 is less than the height of said air space 76, i.e., the thickness of said spacers.

In this way, the bag 24 is housed between adjacent and packaged cells 16 without being compressed by the cells themselves. In fact, in this configuration, the relevant axial compressive forces between adjacent cells 16 are not discharged on the bags 24 but they are discharged on the spacers 72. The spacers 72 may be dimensioned in order to support and oppose to the compressive forces between adjacent cells 16 which may reach several tens of kilograms.

The bags 24, instead, may be housed between adjacent cells 16 without being exposed to additional compressive strength due to the thrust of adjacent cells 16. In other words, the bags 24 have to resist and oppose to the exclusive pressure force of the coolant fluid flowing through them.

In this way it is possible to dimension the walls of the bags 24 so as to keep them very thin, since they have not to be highly compressed by adjacent cells 16.

Thanks to the reduced thickness of the bags 24, several advantages are obtained.

In fact, the deformability of the bags is augmented so that they may adapt their shape to the shape of the external walls 20 of the cells 16.

In this way the heat exchange surface between the bags 24 and the cells 16 is increased.

At the same time, it is possible to reduce the thickness of the bags 24 so as to increase the heat exchange between the coolant fluid, contained therein, and the walls 20 of the cells 16. Therefore, the heat exchange between the walls 20 of the cells 16 is highly increased without risking the breakage of the bags 24 and the consequent scattering of the coolant contained therein, which would compromise the coolant of the cells.

According to a further embodiment, the bag 24 comprises gaps 80, i.e. portions without liquid surrounding the spacers so as not to subject the bag 24 to any compression by the cells 16. It's also possible to provide spacers on the bottom wall 44 of the cells 16 so as to maintain such cells 16 in raised position from a corresponding support surface or plate. Preferably the air space 76 identified between said bottom wall 44 and the support plate of the cells is at least partially filled by at least one bag 24.

The air space 76 may not be present and, between two groups of adjacent cells 16, only one bag 24 may be provided.

We will now describe the method of mounting a cooling circuit for lithium-ion batteries in vehicles, according to this invention. In particular, the mounting method includes the steps of:
- providing a battery pack 8 comprising a plurality of cells 16 electrically connected to each other, suitable for powering an electric machine for traction 12, said cells 16 being delimited perimetrally by outer walls 20,
- providing at least one bag 24 containing cooling fluid associated with contact with the outer walls 24 of the cells 16, wherein said at least one bag 24 is made of electrically insulating and deformable material,
- applying the deformable bag 24 to the outer walls 24 of the cells 16 to make it adhere perimetrally to said outer walls 24,
- providing forced circulation 27 of the cooling fluid inside the at least one bag 24.

In particular, the step of positioning the bags 24 around the cells 16 is facilitated by the deformability of the bags themselves, which can be moulded or counter-shaped with respect to the specific geometry of the outer walls 20 of the cells 16 so as to increase the more the heat exchange surface as much as possible and therefore the efficiency of the cooling circuit.

To facilitate the maintenance of the deformation of the bags 24 around the cells 16 thermally conductive adhesives and/or connection elements 32 are used, especially in correspondence of the curved segments 36 of the bags.

As can be appreciated from the description, the cooling circuit according to the invention allows overcoming the drawbacks presented in the prior art.

In fact, the cooling system described so far is particularly efficient in terms of thermostatting the lithium-ion battery pack, which can work in optimal temperature conditions and therefore have a particularly long life and high efficiency.

Moreover, the system described is particularly simple and therefore economical to produce and to assemble.

The system is also lightweight and does not significantly increase the weight of the system and vehicle: in this way the performance of the hybrid propulsive unit and of the vehicle is not penalised in terms of fuel consumption, polluting emissions and vehicle dynamics.

Furthermore, this invention leads to a drastic reduction of the costs of the cooling system of the battery pack, high efficiency and high performance as well as, as seen, a low specific weight of the cooling system.

This ensures a longer life of the battery pack because it is always operating in optimal temperature conditions due to the effectiveness of the cooling system applied to it.

In addition, the solution of this invention allows avoiding any over-dimensioning of the battery pack in order to limit the production of thermal energy and thus reduce the problem of its dissipation, like some solutions of the prior art; in fact, this invention allows a rapid and efficient dissipation of heat.

Furthermore, this invention is able to thermostat to cells of the batteries even when the propulsor is turned off, for example when the vehicle is parked.

In fact, the cooling fluid contained in the ducts of the circuit that surround the cells is able, obviously within certain limits, to thermostat the cells themselves even in the absence of the forced circulation of the liquid itself.

In addition, the solution of this invention allows simplifying the assembly of the cooling circuit on the battery pack. In fact, the deformable bags can be adapted and shaped directly on the geometry of the outer walls of the cells and fixed by the use of thermally conductive adhesives and/or the connection elements. It is therefore not necessary, as in some prior art solutions, to provide plastic plates preformed and pre-assembled on the specific geometry of the battery to be cooled. In other words, within certain dimensional limits, it is possible to make bags or flexible tubes of standardised dimensions that can be applied directly on battery packs of different types and dimensions.

A person skilled in the art, in order to satisfy contingent and specific needs, may make numerous modifications and variations to the solutions described above, all however contained within the scope of the invention as defined by the following claims.

The invention claimed is:

1. A cooling circuit with cooling fluid for lithium ion batteries comprising:
   - a battery pack comprising a plurality of cells electrically connected to each other, suitable for powering an electric machine for traction,
   - said cells being perimetrally delimited by outer walls,
   - at least one bag containing cooling fluid associated with contact with said outer walls of the cells,
   - wherein said at least one bag is made of electrically insulating and deformable material so as to be counter-shaped to said outer walls to adhere perimetrally to said outer walls,
   - circulation member that acts to force the cooling fluid through said at least one bag,
   - wherein spacers are arranged between the cells adjacent to each other, said spacers acting to create abutments for the packing of the cells composing the battery pack, wherein the bag interposed between adjacent cells has a thickness/shape less than that of an interspace between the adjacent cells, so that the bag is not compressed between adjacent cells,
   - wherein said bag is associated with a plurality of connecting elements suitable for performing an anchorage between the bag and the outer walls of the cells, and
   - wherein the connecting elements are hollow bushings which are crossed by the cooling fluid which are arranged in direct contact with the outer walls of the cells, so as to allow, at the bushes, a direct contact between the coolant and the outer walls of the cells.

2. The cooling circuit as set forth in claim 1, wherein the bag comprises gaps, without liquid surrounding the spacers so as not to subject the bag to any compression by the cells packed together.

3. The cooling circuit as set forth in claim 1, wherein the bag is at least partially attached to the outer walls by interposed thermally conductive adhesives.

4. The cooling circuit as set forth in claim 1, wherein the thickness of the material composing said bag is between 50 and 350 microns.

5. The cooling circuit as set forth in claim 1, wherein said bag comprises at least one internal path so as to create a circulation of the cooling fluid according to a predetermined path.

6. The cooling circuit as set forth in claim 1, wherein said bag has a tubular conformation so as to be folded and wrapped around the outer walls of said cells.

7. The cooling circuit as set forth in claim 1, wherein said connecting elements are thermally conductive so as to facilitate heat dissipation from the cells to the cooling fluid.

8. The cooling circuit as set forth in claim 1, wherein the connecting elements are attached to the outer walls of the cells by thermally conductive adhesives.

9. The cooling circuit as set forth in claim 1, wherein the connecting elements are positioned in the vicinity of curved portions of the bag around the outer walls of the cells.

10. The cooling circuit as set forth in claim 1, wherein the outer walls of at least one cell are provided with cooling fins.

11. The cooling circuit as set forth in claim 10, wherein at least one bag is applied in contact with at least one cooling fin.

12. The cooling circuit as set forth in claim 1, wherein the circuit comprises a plurality of bags, each associated with a cell, said bags being fluidically connected to each other.

13. The cooling circuit as set forth in claim 1, wherein the circuit comprises at least one bag associated with a plurality of cells.

14. The cooling circuit as set forth in claim 1, wherein the outer walls comprise bottom walls and top walls of the cells, wherein the bottom walls define a support surface of the cells and the top walls are opposite the bottom walls.

15. A vehicle comprising an electric machine for traction and a cooling circuit with cooling liquid for lithium ion batteries as set forth in claim 1, wherein the electrical machine for traction is electrically connected to said lithium-ion batteries.

16. A cooling circuit with cooling fluid for lithium ion batteries comprising:
   a battery pack comprising a plurality of cells electrically connected to each other, suitable for powering an electric machine for traction,
   said cells being perimetrally delimited by outer walls,
   at least one bag containing cooling fluid associated with contact with said outer walls of the cells,
   wherein said at least one bag is made of electrically insulating and deformable material so as to be counter-shaped to said outer walls to adhere perimetrally to said outer walls,
   a circulation member that acts to force the cooling fluid through said at least one bag, said circulation member including, a flexible lung which pressurises the liquid inside said circuit, so as to favour contact between the cooling liquid and the outer walls of the cells, said flexible lung including a tubular elastic inserted around the bag which in turn envelops the battery pack or the individual cells so as to influence the bag in contact with said outer walls of the cells to be cooled, and
   wherein spacers are arranged between the cells adjacent to each other, said spacers acting to create abutments for the packing of the cells composing the battery pack, wherein the bag interposed between adjacent cells has a thickness/shape less than that of an interspace between the adjacent cells, so that the bag is not compressed between adjacent cells.

17. A cooling circuit with cooling fluid for lithium ion batteries comprising:
   a battery pack comprising a plurality of cells electrically connected to each other, suitable for powering an electric machine for traction,
   said cells being perimetrally delimited by outer walls,
   at least one bag containing cooling fluid associated with contact with said outer walls of the cells,
   wherein said at least one bag is made of electrically insulating and deformable material so as to be counter-shaped to said outer walls to adhere perimetrally to said outer walls,
   a circulation member that acts to force the cooling fluid through said at least one bag, said circulation member including, a flexible lung which pressurises the liquid inside said circuit, so as to favour contact between the cooling liquid and the outer walls of the cells, said flexible lung including a containment structure arranged around the bag so as to influence the bag in abutment against the outer walls of the cells to be cooled, wherein said containment structure encloses an elastic membrane which on the one hand interfaces with the bag and on the other is elastically influenced in compression against the bag by an elastic membrane such as springs and/or pressurised fluids, and
   wherein spacers are arranged between the cells adjacent to each other, said spacers acting to create abutments for the packing of the cells composing the battery pack, wherein the bag interposed between adjacent cells has a thickness/shape less than that of an interspace between the adjacent cells, so that the bag is not compressed between adjacent cells.

* * * * *